United States Patent [19]

Kasegawa

[11] Patent Number: 4,874,059

[45] Date of Patent: Oct. 17, 1989

[54] CONTROL DEVICE FOR DIFFERENTIAL LIMITING MECHANISMS OF FOUR-WHEEL DRIVE CAR

[75] Inventor: Norimichi Kasegawa, Susono, Japan

[73] Assignee: Toyota Jidosha Kabushiki Kaisha, Aichi, Japan

[21] Appl. No.: 200,924

[22] Filed: Jun. 1, 1988

[30] Foreign Application Priority Data

Jun. 26, 1987 [JP] Japan ............................... 62-157839

[51] Int. Cl.⁴ .......................................... B60R 17/34
[52] U.S. Cl. .................................... 180/249; 180/197; 364/424.1
[58] Field of Search ....................... 180/197, 248, 249; 364/424.1

[56] References Cited

U.S. PATENT DOCUMENTS

| | | | |
|---|---|---|---|
| 4,671,373 | 6/1987 | Sigl | 180/197 |
| 4,771,850 | 9/1988 | Matsuda | 180/197 |
| 4,776,424 | 10/1988 | Naito | 180/197 X |
| 4,790,404 | 12/1988 | Naito | 180/197 |

FOREIGN PATENT DOCUMENTS 63-232030 9/1988 Japan .

OTHER PUBLICATIONS

"Autocar", Feb. 26, 1986, pp. 22–23.

Primary Examiner—Charles A. Marmor
Assistant Examiner—Michael Mar
Attorney, Agent, or Firm—Oliff & Berridge

[57] ABSTRACT

A control device for controlling differential limiting mechanisms of a four-wheel drive car provided with a central differential gear having a first differential limiting mechanism, a differential gear having a second differential limiting mechanism incorporated in a rear drive shaft and a differential gear incorporated in a front drive shaft includes sensors for detecting the rotational frequencies of the wheels, actuators for operating the respective differential limiting mechanisms and a controller. The controller controls the actuators such that the differential is greatly limited by the first differential limiting mechanism when a difference between the rotational frequencies of the front and rear wheels is larger than a predetermined value and the differential is greatly limited by the second differential limiting mechanism when a difference between the rotational frequencies of the left and right wheels is larger than a predetermined value.

7 Claims, 4 Drawing Sheets

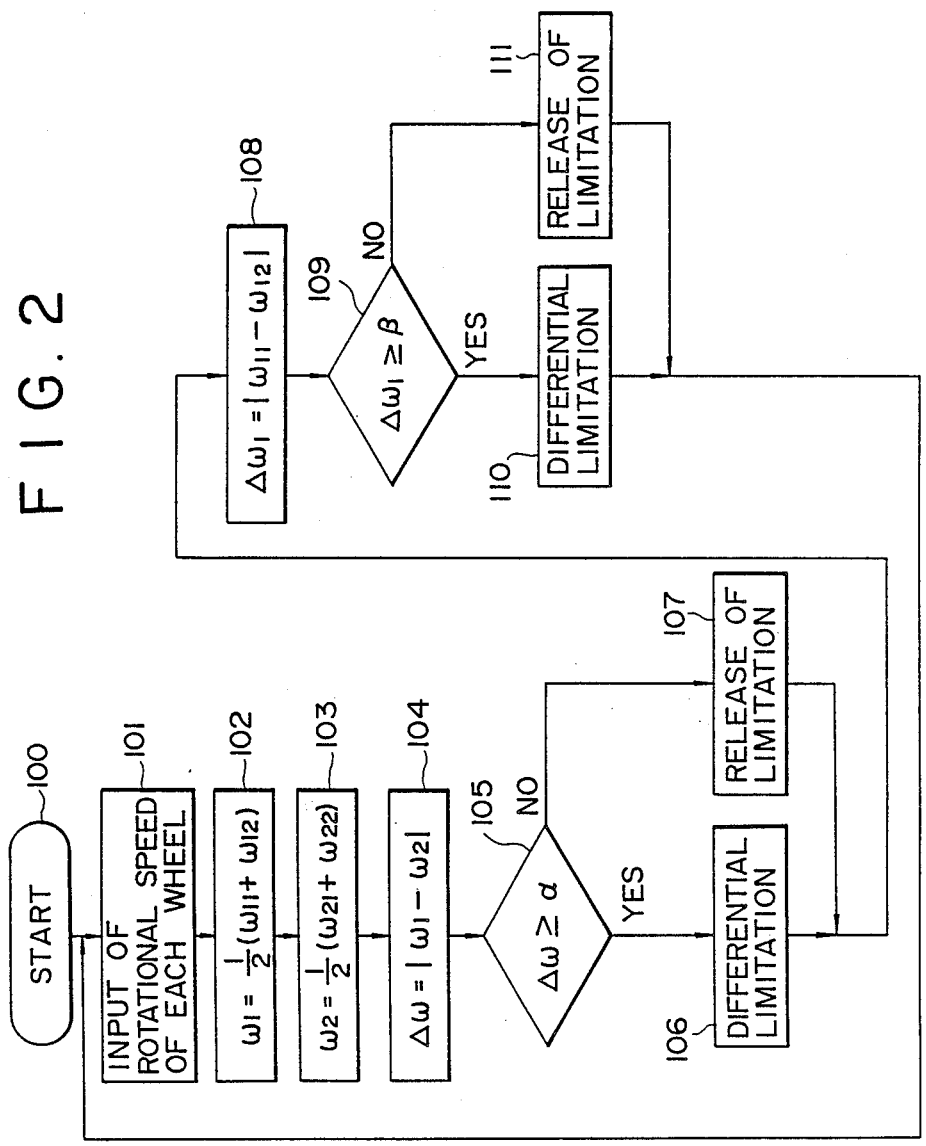

CONTROL DEVICE FOR DIFFERENTIAL LIMITING MECHANISMS OF FOUR-WHEEL DRIVE CAR

BACKGROUND OF THE INVENTION

1. Field of the Invention

This invention relates to a control device for differential limiting mechanisms of a four-wheel drive car and, more particularly, to a device for controlling the differential limiting mechanisms in a four-wheel drive car provided with a central differential gear having a first differential limiting mechanism, a differential gear having a second differential limiting mechanism incorporated in one of a drive shaft connected with front wheels and a drive shaft connected with rear wheels and a differential gear incorporated in the other of said drive shafts.

2. Description of the Prior Art

When a vehicle travels in such case that one of left and right driving wheels of the vehicle is on a road surface having low coefficient of friction and the other is on that having ordinary coefficient of friction, the wheel on the road surface having the low coefficient of friction may slip, i.e., may be put under a wheel spin condition. Since driving force is not generated in the other driving wheel when this wheel spin occurs, it is necessary that the differential is limited to ensure traction.

In a four-wheel drive car, the following art has been proposed in which when a difference between revolutions or rotational frequencies of front and rear wheels exceeds a predetermined value, the differential of a central differential gear is limited for a certain period of time and when a difference between rotational frequencies of left and right rear wheels exceeds a predetermined value, the differential of a differential gear of a rear shaft is limited for a certain period of time, and released thereafter from the limitation (Autocar; pages 21–23, Feb. 26, 1986).

A differential control device which has been separately proposed (Patent Application Ser. No. 62-64300) is a device which controls the differential of a differential gear in a vehicle for driving left and right front wheels or left and right rear wheels with the differential gear having a differential limiting mechanism, and comprises means for detecting respective rotational frequencies of the left and right front wheels and left and right rear wheels, a controller for receiving signals from the respective detecting means and means for operating said differential limiting mechanism, wherein said controller controls said operating means such that the differential of said differential gear is limited according to a difference between the rotational frequencies of the left and right wheels driven by said differential gear and said differential gear is released from limitation of the differential according to a difference between the rotational frequencies of the front and rear wheels.

According to the prior art in relation to the four-wheel drive car noted above, when the differential is limited for a certain period of time and then released from limitation, the operation for limiting the differential again when the difference between the rotational frequencies exceeds a predetermined value and then releasing from the limitation is repeated. Therefore, sounds and vibration are generated from operating instruments every time the operation noted above is repeated. Besides, the behavior of vehicle varies intermittently. Thus, travelling feeling may be damaged and the durabilities of the operating instruments are degraded.

According to the art which has been proposed separately is effective in such case that one of the left and right drive wheels is put under the wheel spin condition or the like. However, this art does not cope with the difference between the rotational frequencies of the front and rear wheels.

SUMMARY OF THE INVENTION

An object of the present invention is to provide a control device for differential limiting mechanisms of differential gears in a four-wheel drive car, which restrains frequent operations of operating instruments.

According to the present invention, there is provided a control device for controlling differential limiting mechanisms in a four-wheel drive car provided with a central differential gear having a first differential limiting mechanism, a differential gear having a second differential limiting mechanism incorporated in one of a drive shaft connected with front wheels and a drive shaft connected with rear wheels and a differential gear incorporated in the other of said drive shafts, comprising means for detecting rotational frequencies of left and right front wheels and left and right rear wheels, means for operating said respective differential limiting mechanisms and a controller for receiving signals from said rotational frequency detecting means. The controller controls said respective operating means such that when a difference between the rotational frequencies of the front and rear wheels is equal to or larger than a first predetermined value, the differential is greatly limited by said first differential limiting mechanism and when a difference between the rotational frequencies of the left and right wheels is equal to or larger than a second predetermined value, the differential is greatly limited by said second differential limiting mechanism.

The first predetermined value is set to be larger than a theoretical difference between the rotational frequencies of the front and rear wheels, which generates on the basis of a difference between turning radii of the front and rear wheels at the time of turning of the vehicle. Also, the second predetermined value is set to be larger than a theoretical difference between the rotational frequencies of the left and right wheels, which generates on the basis of a difference between the turning radii of the left and right wheels at the time of turning of the vehicle.

The controller permits the differential of the central differential gear to be greatly limited by the first differential limiting mechanism when the difference between the rotational frequencies of the front and rear wheels is equal to or larger than the first predetermined value. Thus, even if the wheel spin occurs in one of the front and rear wheels, driving force is forcibly transmitted to at least one of the remaining wheels.

When the difference between the rotational frequencies of the left and right wheels is equal to or larger than the second predetermined value, the controller also permits the differential of the differential gear incorporated in the front or rear drive shaft to be greatly limited by the second differential limiting mechanism. Thus, even if the wheel spin occurs in one of the left and right wheels, the driving force is forcibly transmitted to at least one of the remaining wheels.

In the four-wheel drive car, the differential of the central differential gear is limited on the basis of the difference between the rotational frequencies of the front and rear wheels while the differential of the differential gear incorporated in one of the drive shafts is limited on the basis of the difference between the rotational frequencies of the left and right wheels. Accordingly, even if any one of the wheels located on the low frictional coefficient side is put under the wheel spin condition, the driving force may be assured. As a result, the vehicle may securely effectively get away from the wheel spin condition.

The control device, in which the control operation is simple and the controller is easily economically embodied, may be obtained.

Because the repetitive numbers of differential limiting and releasing operations are reduced, the sounds and vibration generated from the operating instruments may be reduced as a whole to improve the durabilities of the instruments. Also, because the variation of behavior of the vehicle is reduced, the running feeling may be improved.

BRIEF DESCRIPTION OF THE DRAWINGS

The foregoing and other objects and features of the invention will become apparent from the following description of a preferred embodiment of the invention with reference to the accompanying drawings, in which:

FIG. 2 is a flow chart showing the control operation;

DETAILED DESCRIPTION OF THE PREFERRED EMBODIMENT

Figure 1:
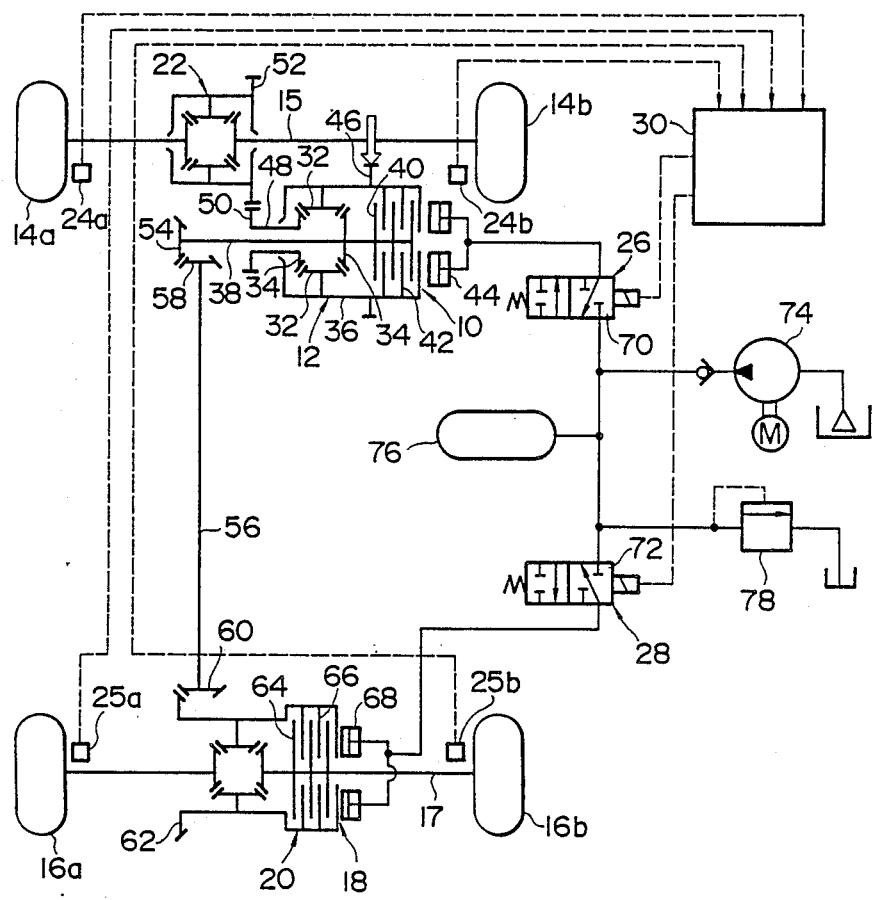
FIG. 1 is a schematic view showing a control device.

Referring to FIG. 1, in a four-wheel drive car provided with a central differential gear 12 having a first differential limiting mechanism 10, a differential gear 20 having a second differential limiting mechanism 18 incorporated in a drive shaft 17 connected with rear wheels 16a, 16b and a differential gear 22 incorporated in a front drive shaft 15 connected with front wheels 14a, 14b, a control device controls the first and second differential limiting mechanisms 10, 18.

The control device comprises means 24a, 24b for respectively detecting rotational frequencies of the left and right front wheels 14a, 14b, means 25a, 25b for respectively detecting rotational frequencies of the left and right rear wheels 16a, 16b, means 26 for operating the differential limiting mechanism 10, means 28 for operating the differential limiting mechanism 18 and a controller 30.

The respective differential gears have the constitution known per se. For example, the differential gear 12 is provided with a plurality of pinions 32, a pair of side gears 34 meshing with these pinions 32 and a differential case 36 rotatably receiving the pinions 32 and side gears 34. A plurality of friction disks 40 engage a shaft 38 slidably and unrotatably which is unrotatably connected with one side gear 34 and a plurality of friction disks 42 engage the differential case 36 slidably and unrotatably. A hydraulic cylinder unit 44 is provided opposedly to the friction disks to constitute a friction type differential limiting mechanism 10 known per se., together with the friction disks 40, 42.

The differential gear 12 having a ring gear 46 which receives driving force transmitted from an engine (not shown) constitutes a central differential gear for distributing the driving force to the front drive shaft 15 and the rear drive shaft 17. A hollow shaft 48 extends from the other side gear 34, and a spur gear 50 connected with this shaft 48 meshes with a ring gear 52 of the differential gear 22 incorporated in the front drive shaft 15.

A bevel gear 54 is connected with the shaft 38 of the differential gear 12 and meshes with a bevel gear 58 connected with a propeller shaft 56. A bevel gear 60 connected with a rear end of the propeller shaft 56 meshes with a ring gear 62 of the differential gear 20 incorporated in the rear drive shaft 17. The differential limiting mechanism 18 provided in the differential gear 20 has the same constitution as the differential limiting mechanism 10 noted above and is provided with a plurality of friction disks 64, 66 and a hydraulic cylinder unit 68.

The rotational frequency detecting means 24a, 24b, 25a and 25b are revolution sensors known per se., each of which is disposed in the neighborhood of each of the wheels as shown in the drawing to detect the revolution per minute of the wheel. The rotational frequency detecting means may be revolution speed sensors known per se.

The means 26 for operating the differential limiting mechanism 10 is provided with a directional control valve 70, while the means 28 for operating the differential limiting mechanism 18 is provided with a directional control valve 72. Both the directional control valves 70, 72 are connected with a pump 74, an actuator 76 and a relief valve 78 in common.

Signals outputted from the respective rotational frequency detecting means are inputted to the controller 30. The controller 30 is a CPU or a computer for receiving these signals and executes calculation and judgement as shown in FIG. 2 for controlling the operating means 26, 28.

The controller 30 is initialized (100) to input (101) rotational frequencies $\omega_{11}$, $\omega_{12}$ of the left and right front wheels and rotational frequencies $\omega_{21}$, $\omega_{22}$ of the left and right rear wheels. An average $\omega_1$ of the rotational frequencies of the front wheels is obtained (102) and an average $\omega_2$ of the rotational frequencies of the rear wheels is obtained (103). Then, an absolute value $\Delta\omega$ of a difference between these averages is obtained (104).

The absolute value $\Delta\omega$ is compared (105) with a predetermined value $\alpha$, where the predetermined value $\alpha$ is set to be larger than the theoretical difference between the rotational frequencies which generates on the basis of a difference between average turning radii of the front and rear wheels during turning of the vehicle.

When the difference $\Delta\omega$ is not smaller than the predetermined value $\alpha$, the condition is set that the differential of the differential gear 12 is to be greatly limited (106) by the differential limiting mechanism 10, then the controller 30 operates the operating means 26. That is, the controller changes over envelopes of the directional control valve 70 provided in the operating means 26 to conduct hydraulic pressure stored in the actuator 76 to the hydraulic cylinder unit 44. Then, the friction disks 40, 42 are held in close contact with each other to generate frictional force in proportion to pressure applied to the hydraulic cylinder unit 44 and the differential of the differential gear 12 is limited. 7 When the difference $\Delta\omega$ is smaller than the predetermined value $\alpha$, the condition is set so that the limitation of differential is to be lessened (107) and the controller 30 changes over the envelopes of the directional control valve 70 of the operating means 26. As a result, the hydraulic pressure in the hydraulic cylinder unit 44 is released and the friction disks 40, 42 are separated from each other, so that the differential of the differential gear 12 becomes possible.

Then, an absolute value $\Delta\omega_1$ of a difference between the rotational frequencies of the left and right front wheels is obtained (108) to be compared (109) with a predetermined value $\beta$. The predetermined value $\beta$ is set to be larger than a difference between the rotational frequencies theoretically obtained on the basis of the difference between the turning radii of the left and right wheels during turning of the vehicle.

When the difference $\Delta\omega_1$ is not smaller than the predetermined value $\beta$, the condition is set that the differential is to be greatly limited (110), and the controller operates the operating means 28. Namely, the controller 30 changes over envelopes of the directional control valve 72 provided in the operating means 28 to conduct hydraulic pressure stored in the actuator 76 to the cylinder unit 68. Then, the friction disks 64, 66 are held in close contact with each other to generate frictional force, so that the differential of the differential gear 20 is limited.

When the difference $\Delta\omega_1$ is smaller than the predetermined value 8, the condition is set so that the limitation of differential is to be lessened (111), and the controller 30 changes over the directional control valve 72 of the operating means 28. As a result, the hydraulic pressure in the cylinder unit 68 is released and the friction disks 64, 66 are separated from each other, so that the differential of the differential gear 20 becomes possible.

According to the embodiment shown, since the absolute value of the difference $\Delta\omega_1$ is obtained by subtracting the rotational frequency of the front right wheel from that of the front left wheel and the front drive shaft 15 extends from the differential gear 22 having no differential limiting mechanism, large value of the difference $\Delta\omega_1$ can be obtained to make the control easy.

According to the operation noted above, the condition that the differential is greatly limited means a locked one in case that the differential limiting mechanism is constituted to change over in a locked condition and in a free one, while the condition that the limitation of the differential is lessened means the free one or the completely released condition of the differential.

When a current controlled pressure-reducing valve, for example, is used instead of each of the directional control valves 70,72 of the operating means 26, 28, this current controlled pressure-reducing valve may generate pressure which is varied in proportion to supplied current, so that the differential limiting amount of the differential limiting mechanism may be adjusted infinitively variably.

Figure 4:
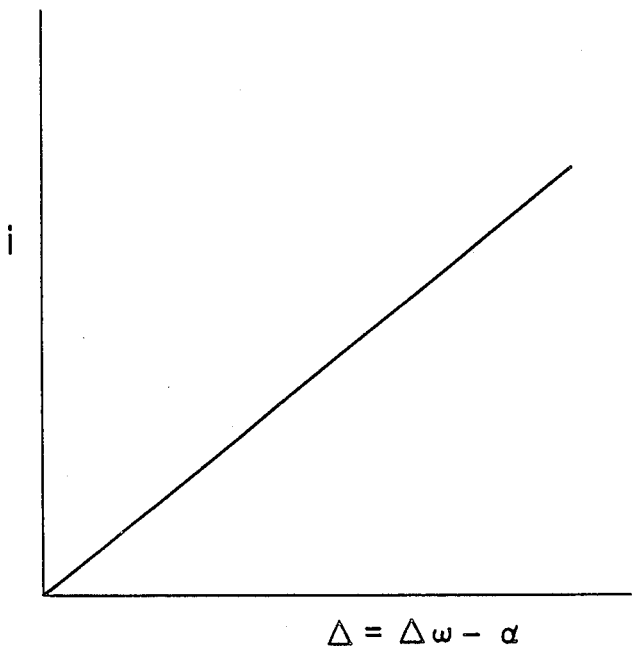
FIG. 4 is a graph to be stored in a controller as a map.

In this case, as shown in FIG. 4, in order to obtain current i corresponding to the amount of a difference $\Delta$, a graph plotted in a coordinate having an abscissa representing the difference $\Delta$ between the difference $\Delta\omega$ between the rotational frequencies of the front and rear wheels and the predetermined value $\alpha$ and an ordinate representing current i in direct proportion to each other is stored as a map. When the difference $\Delta$ is positive, current i corresponding to the amount of the difference $\Delta$ is obtained to thereby control the operating means. Thus, when the difference $\Delta\omega$ is not smaller than the predetermined value $\alpha$, the differential may be controlled such that the differential is limited in proportion to the difference $\Delta$ by the differential limiting mechanism. The similar control may be attained by a difference $\Delta_1$ between the difference $\Delta\omega_1$ and the predetermined value $\beta$ and a current.

Instead of the aforementioned embodiment, the differential gear 22 incorporated in he front drive shaft 15 may be provided with the differential limiting mechanism, while the differential gear 20 incorporated in the rear drive shaft 17 may dispense with the differential limiting mechanism.

Figure 3A:
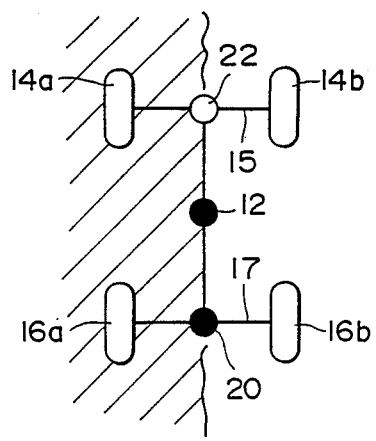
FIG. 3 is a schematic view showing the operation and effect of the control device.
Figure 3B:
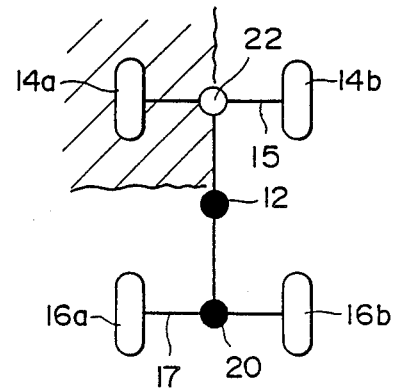
Figure 3C:
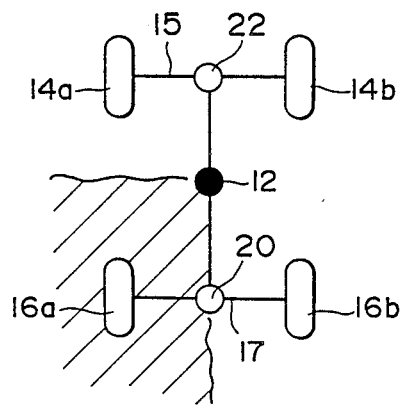

FIG. 3 shows the operation and effect according to the control noted above. In the drawing, the position of a circle shows the differential gear, a white circle shows the released condition of the differential and a black circle shows the limited condition of the differential. Also, a hatched portion shows the road surface having the low coefficient of friction.

When the wheels 14a, 16a at the left side of the four-wheel drive car are on the road surface having the low coefficient of friction (FIG. 3a), the driving force is transmitted from an engine to make the left side wheels 14a, 16a put under the wheel spin condition. As a result, the difference $\Delta\omega_1$ between the rotational frequencies of the left and right wheels is enlarged to limit the differential of the rear differential gear 20. When the differential of the differential gear 20 is limited, the difference $\Delta\omega$ between the rotational frequencies of the front and rear wheels is enlarged to limit the differential of the central differential gear 12, so that the driving force is generated in the rear right side wheel 16b. Thus, the vehicle may advance.

When the front left side wheel 14a is on the road surface having the low coefficient of friction (FIG. 3b), the driving force is transmitted from the engine to make only the front left side wheel 14a put under the wheel spin condition. As a result, both the differences $\Delta\omega$ and $\Delta\omega_1$ are enlarged to limit respective differentials of the central and rear differential gears 12, 20, so that the driving force is generated in the rear drive shaft 17 and thereby the vehicle may advance.

When the rear left side wheel 16a is on the road surface having the low coefficient of friction (FIG. 3c), the driving force is transmitted from the engine to make the rear left side wheel 16a put under the wheel spin condition. As a result, the difference $\Delta\omega$ between the rotational frequencies of the front and rear wheels is enlarged to limit the differential of the central differential gear 12, so that the driving force is generated in the front drive shaft 15 and thereby the vehicle may advance.

What is claimed is:

1. A control device for controlling differential limiting mechanisms of a full time four-wheel drive car provided with a central differential gear having a first differential limiting mechanism, a differential gear having a second differential limiting mechanism incorporated in one of a drive shaft connected with front wheels and a drive shaft connected with rear wheels and a differential gear incorporated in the other of said drive shafts, comprising:

means for detecting the rotational frequencies of left and right front wheels and left and right rear wheels;

means for operating said respective differential limiting mechanisms; and a controller for receiving signals from said rotational frequency detecting means, wherein said controller controls said respective operating means such that the differential motion between the front and rear wheels is greatly limited by said first differential limiting mechanism when a difference between the rotational frequencies of the front and rear wheels is equal to or larger than a first predetermined value and differential motion between the right and left wheels is greatly limited by said second differential limiting mechanism when a difference between the rotational frequencies of the left and right wheels is equal to or larger than a second predetermined value.

2. A control device as claimed in claim 1, wherein the differential gear incorporated in the other of the drive shafts has no differential limiting mechanism, and wherein the rotational frequencies of the left and right wheels are detected by the detecting means which are disposed respectively in relation to the left and right wheels connected with the other of the drive shafts.

3. A control device as claimed in claim 1, wherein said first predetermined value is set to be larger than a theoretical difference between the rotational frequencies of the front and rear wheels generating on the basis of a difference between turning radii of the front and rear wheels at the time of turning of the vehicle.

4. A control device, as claimed in claim 1, wherein said second predetermined value is set to be larger than theoretical difference between the rotational frequencies of the left and right wheels generating on the basis of a difference between turning radii of the left and right wheels at the time of turning of the vehicle.

5. A control device as claimed in claim 1, wherein each of the differential limiting mechanisms is constituted to change over in a locked condition and in a free one.

6. A control device as claimed in claim 1, wherein each of the differential limiting mechanisms is constituted to change the differential continuously.

7. A control device for controlling differential limiting mechanisms of a full time four-wheel drive car provided with a central differential gear having a first differential limiting mechanism, a differential gear having a second differential limiting mechanism incorporated in one of a drive shaft connected with front wheels and a drive shaft connected with rear wheels and a differential gear having no differential limiting mechanism incorporated in the other of said drive shafts, comprising:

means for detecting the rotational frequencies of left and right front wheels and left and right rear wheels;

first means for operating said first differential limiting mechanism;

second means for operating said second differential limiting mechanism;

a controller for receiving signals from said rotational frequency detecting means, wherein said controller controls said first operating means such that differential motion between the front and rear wheels is greatly limited by said first differential limiting mechanism when a difference between the rotational frequencies of the front and rear wheels is equal to or larger than a first predetermined value, the value being set to be larger than a theoretical difference between the rotational frequencies of the front and rear wheels generating on the basis of a difference between turning radii of the front and rear wheels at the time of turning of the vehicle, wherein said controller controls said second operating means such that differential motion between the right and left wheels is greatly limited by said second differential limiting mechanism when a difference between the rotational frequencies of the right and left wheels is equal to or larger than a second predetermined value, the value being set to be larger than a theoretical difference between the rotational frequencies of the right and left wheels generating on the basis of a difference between turning radii of the left and right wheels at the time of turning the vehicle.

* * * * *